United States Patent
Park

(10) Patent No.: US 10,445,074 B2
(45) Date of Patent: Oct. 15, 2019

(54) METHOD OF OPTIMALLY COMPILING PLC COMMAND

(71) Applicant: LSIS CO., LTD., Gyeonggi-do (KR)

(72) Inventor: Chang-Woo Park, Gyeonggi-do (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 108 days.

(21) Appl. No.: 15/331,523

(22) Filed: Oct. 21, 2016

(65) Prior Publication Data

US 2017/0115972 A1    Apr. 27, 2017

(30) Foreign Application Priority Data

Oct. 21, 2015 (KR) .................. 10-2015-0146850

(51) Int. Cl.
*G06F 8/41*       (2018.01)
*G05B 19/05*      (2006.01)
*G06F 11/36*      (2006.01)

(52) U.S. Cl.
CPC ......... *G06F 8/4434* (2013.01); *G05B 19/056* (2013.01); *G06F 8/423* (2013.01); *G06F 8/443* (2013.01); *G06F 8/4441* (2013.01); *G06F 11/362* (2013.01); *G05B 2219/13119* (2013.01)

(58) Field of Classification Search
CPC ......... G06F 8/443; G06F 8/4434–4443; G05B 19/056
USPC .......................................... 711/154
See application file for complete search history.

(56) References Cited

U.S. PATENT DOCUMENTS

| 5,177,420 | A | * | 1/1993 | Wada | G05B 19/056 318/568.1 |
| 5,285,376 | A | * | 2/1994 | Struger | G05B 19/056 700/18 |
| 5,287,548 | A | * | 2/1994 | Flood | G05B 19/056 700/18 |
| 5,940,622 | A | * | 8/1999 | Patel | G06F 8/445 717/158 |
| 6,028,997 | A | * | 2/2000 | Leymann | G06F 8/10 705/7.27 |

(Continued)

FOREIGN PATENT DOCUMENTS

| CN | 1382280 A | 11/2002 |
| CN | 1482540 A | 3/2004 |

(Continued)

OTHER PUBLICATIONS

Yazawa Hisao; "Visual Basic beyond Windows: No. 1 2 times (last round) Why is the VB program slow?" Nikkei software, Japan, day BP company, May 24, 1999, vol. 2, No. 6 (vol. 12), p. 129 (4 pages).

(Continued)

*Primary Examiner* — Jason D Mitchell
(74) *Attorney, Agent, or Firm* — K&L Gates LLP

(57) ABSTRACT

Disclosed embodiments include a system and a method of compiling a PLC (Programmable Logic Controller) command. In some embodiments, the method includes: determining one compile processing scheme chosen from a plurality of compile processing schemes for a command included in a program to be executed in a PLC; and executing a command compile or compiler optimized for a rate or a size based on the chosen compile processing scheme.

5 Claims, 10 Drawing Sheets

(56) References Cited

U.S. PATENT DOCUMENTS

| | | | |
|---|---|---|---|
| 6,292,940 B1* | 9/2001 | Sato | G06F 8/4441 717/157 |
| 6,986,130 B1* | 1/2006 | Boucher | G06F 8/4441 717/150 |
| 7,412,369 B1* | 8/2008 | Gupta | G06F 11/3457 703/1 |
| 7,710,988 B1* | 5/2010 | Tripathi | H04L 63/0227 370/395.52 |
| 9,134,980 B1* | 9/2015 | Cabrera | G06F 8/48 |
| 2001/0032332 A1* | 10/2001 | Ward | G06F 8/4441 717/160 |
| 2002/0004804 A1* | 1/2002 | Muenzel | G05B 19/056 715/239 |
| 2004/0025150 A1* | 2/2004 | Heishi | G06F 8/425 717/154 |
| 2005/0086653 A1* | 4/2005 | Heishi | G06F 8/4442 717/151 |
| 2006/0236310 A1* | 10/2006 | Domeika | G06F 8/443 717/140 |
| 2008/0005473 A1* | 1/2008 | Chen | G06F 8/4442 711/118 |
| 2009/0055815 A1* | 2/2009 | Chan | G06F 8/443 717/160 |
| 2010/0125838 A1* | 5/2010 | Kuusilinna | G06F 8/443 717/158 |
| 2012/0159459 A1* | 6/2012 | Turner | G06F 8/314 717/138 |
| 2012/0239201 A1* | 9/2012 | Kobayashi | G05B 19/056 700/275 |
| 2013/0006398 A1* | 1/2013 | Mossner | G06F 8/4442 700/86 |
| 2013/0014274 A1* | 1/2013 | Goodes | G06F 21/6209 726/26 |
| 2014/0136911 A1* | 5/2014 | Kao | G01R 31/31705 714/724 |
| 2015/0212838 A1* | 7/2015 | Pirvu | G06F 9/45516 717/148 |
| 2015/0277876 A1 | 10/2015 | Yamanaka | |
| 2015/0331406 A1 | 11/2015 | Wang | |
| 2016/0321032 A1* | 11/2016 | Cammarota | G06F 8/00 |
| 2016/0321048 A1* | 11/2016 | Matsuura | G06F 8/4443 |
| 2018/0107465 A1* | 4/2018 | Silbermintz | G06F 8/447 |

FOREIGN PATENT DOCUMENTS

| | | |
|---|---|---|
| CN | 102393670 A | 3/2012 |
| CN | 102566483 A | 7/2012 |
| CN | 102750177 A | 10/2012 |
| CN | 102855137 A | 1/2013 |
| EP | 0926595 A2 | 6/1999 |
| JP | H02133825 A | 5/1990 |
| JP | H1195813 A | 4/1999 |
| JP | 2003131889 A | 5/2003 |
| JP | 2005141435 A | 6/2005 |
| JP | 2009223590 A | 10/2009 |
| JP | 2009282934 A | 12/2009 |
| JP | 2015125713 A | 7/2015 |
| KR | 1019990080902 A | 11/1999 |
| KR | 20130132340 A | 12/2013 |
| KR | 20140003084 A * | 1/2014 |

OTHER PUBLICATIONS

Japanese Office Action for related Japanese Application No. 2016-206507; action dated Nov. 21, 2017; (5 pages).

European Search Report dated Jan. 17, 2017 in corresponding European Application No. 16192816.3.

Chinese Office Action for related Chinese Application No. 201610916790.7; action dated Dec. 3, 2018; (7 pages).

* cited by examiner

PLC COMMAND PROCESSING

METHOD OF OPTIMALLY COMPILING PLC COMMAND

CROSS REFERENCE TO RELATED APPLICATIONS

This application claims the benefit of Korean Patent Application No. 10-2015-0146850, filed on Oct. 21, 2015, entitled "OPTIMIZATION METHOD FOR COMPILING PROGRAMMABLE LOGIC CONTROLLER COMMAND", which is hereby incorporated by reference in its entirety.

BACKGROUND

Technical Field

The present disclosure relates to a method and system of optimally compiling a PLC (Programmable Logic Controller) command, and in particular, a method of optimally compiling the PLC command, in which, in order to improve a compile or compiler processing scheme for a PLC command to be compiled by a PADT (Programming And Debugging Tool) compiler, the user's program may be optimized by choosing a rate option or a size option based on a user's environment to compile the command by a compile processing scheme optimized for a rate or for a size.

Description of the Related Art

A system such as a factory automation system at an industrial field employs an integrated control apparatus such as a Programmable Logic Controller (PLC). The PLC is equipped with a universal Main Processing Unit (MPU) as a fundamental unit. The MPU performs a compiling process of converting a program, which a user has written using a Programming And Debugging Tool (PADT), into codes which the PLC can recognize.

Therefore, in order to drive the PLC, the program written by the user using the PADT should be converted such that the MPU can recognize it.

The PADT is software which executes programming, editing, and debugging functions. The PADT executes functions of compiling a command in a project created by a user such the PLC can recognize it and then downloading to the PLC.

At this time, the command may be compiled by the PADT in a variety of methods and may be varied in, e.g., an execution rate or a modifiability, depending on the employed methods.

Meanwhile, a processing rate of command and a size of program are the key factors with respect to the performance of the PLC. Specifically, the higher the processing rate is, the productivity can increase, and the larger the size of the program is, the more input/output can be controlled.

In a prior art, the PLC supports only a fixed processing rate of command and a fixed size of program and thus cannot flexibly modify the processing rate of command and the size of program suitably to characteristics of a system.

Therefore, there are problems that the PLC should be replaced with an upper version thereof or the system should be changed when the command processing rate is low or the program size is insufficient in actual practice.

SUMMARY

It is an aspect of some embodiments of the present disclosure to provide a method of optimally compiling a PLC (Programmable Logic Controller) command, and in particular, a method of optimally compiling the PLC command, in which, in order to improve a compile or compiler processing scheme for a PLC command to be compiled by a PADT (Programming And Debugging Tool) compiler, the user's program may be optimized by choosing a rate option or a size option based on a user's environment so that the command by a compile or compiler processing scheme optimized for a rate or a compile processing scheme optimized for a size can be compiled.

Other objects of some embodiments of the present disclosure are not limited to the above-described object and other objects and advantages can be appreciated by the following description described with reference to the embodiments of the present disclosure.

In accordance with an aspect of the present disclosure, a method of compiling a PLC (Programmable Logic Controller) command is provided, the method including: determining one compile or compiler processing scheme chosen from a plurality of compile or compiler processing schemes for a command included in a program to be executed in a PLC; and executing a command compile or compiler optimized for a rate or a size based on the chosen compile or compiler processing scheme (or determined compile or compiler processing scheme).

The executing a command compile may include: determining whether the chosen compile processing scheme is a simple command processing based on any established criterion when the chosen compile processing scheme is determined to be for the size; when the chosen compile processing scheme is determined to be a simple compile processing scheme, executing the command compile in an assembly language by a direct compile processing scheme; and when the chosen compile processing scheme is determined to not be a simple compile processing scheme, executing the command compile in an indirect compile processing scheme by identifying an address of a command processing function stored in a binary file with reference to a command map table optimized for the rate, followed by invoking the command processing function, followed by copying the command processing function needed to execute the command into a compile area to identify the address of the command processing function upon driving the PLC, and followed by invoking the stored function to execute the command.

The executing a command compile may include: when the chosen compile processing scheme is determined to be for the size, executing the command compile in an indirect compile processing scheme by identifying an address of a command processing function stored in a binary file with reference to a command map table optimized for the size, followed by invoking the command processing function, followed by copying the command processing function needed to execute the command into a compile area to identify the address of the command processing function upon driving the PLC, and followed by invoking the stored function to execute the command.

The executing a command compile may include: when the chosen compile processing scheme is determined to be default, determining whether the chosen compile processing scheme is a simple command processing based on any established criterion; when the chosen compile processing scheme is determined to be a simple compile processing scheme, executing the command compile by a direct compile processing scheme; and when the chosen compile processing scheme is determined to not be a simple compile processing scheme, executing the command compile in an indirect compile processing scheme by identifying an address of a command processing function stored in a binary file with reference to a command map table set by default, followed by invoking the command processing function, followed by copying the command processing function needed to execute the command into a compile area to identify the address of the command processing function upon driving the PLC, and followed by invoking the stored function to execute the command.

The determining one compile processing scheme may include: providing a first option box corresponding to a rate and a second option box corresponding to a size; and determining that the rate option is chosen if the first option box has been checked, the size option is chosen if the second option box has been checked, and the default is chosen if no option box has been checked.

The method of optimally compiling the PLC command may set to automatically choose one compile processing scheme of a plurality of compile processing schemes for the command based on a program size or a remaining data storage capacity in the PLC.

The setting to automatically choose one compile processing scheme: may set to choose the compile processing scheme for the rate under a normal condition or for the size when the program size is over any reference size.

The setting to automatically choose one compile processing scheme may set to choose the compile processing scheme for the rate under a normal condition or for the size when the remaining data storage capacity in the PLC is below any reference capacity.

In accordance with another aspect of some embodiments of the present disclosure, the present disclosure may improve a compile processing scheme in a PADT (Programming And Debugging Tool) compiler in a way of choosing a rate option or a size option based on a user's circumstance to compile a command based on a compile processing scheme optimized for a rate or for a size, thereby optimizing a user's program.

In accordance with still another aspect of some embodiments of the present disclosure, a method of optimally compiling a PLC program causes a user to choose any compile processing scheme so that the PLC program can be flexibly applied to various systems.

For example, upon choosing a rate option, it may increase its rate in various ways by providing a compile processing scheme optimized for the rate. On the contrary, upon choosing a size option, its size is optimized in order to increase an efficiency of a program storage capacity, and upon choosing no option, compile may be executed using elementary object codes.

DETAILED DESCRIPTION

Figure 1:
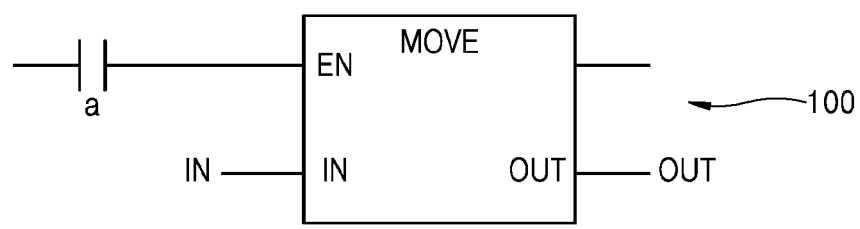
FIG. 1 is a block diagram illustrating user's codes in a method of optimally compiling a PLC command according to an embodiment of the present disclosure.

The present disclosure may be variously modified and include various embodiments. Therefore, some specific embodiments will be exemplified in the drawings by way of illustrations and be described in the detailed description below. However, this is not intended to limit the present disclosure to the specific embodiments and it is to be understood that they cover all modifications, equivalents, or alterations falling into the spirit and the scope of the present disclosure.

Hereinafter, embodiments according to the present disclosure will be described in detail with reference to the accompanying drawings.

FIG. 1 is a block diagram illustrating user's codes in a method of optimally compiling a PLC command according to some embodiments of the present disclosure.

Referring to FIG. 1, a user writes a program 100 by using a Programming and Debugging Tool (PADT).

Figure 2:
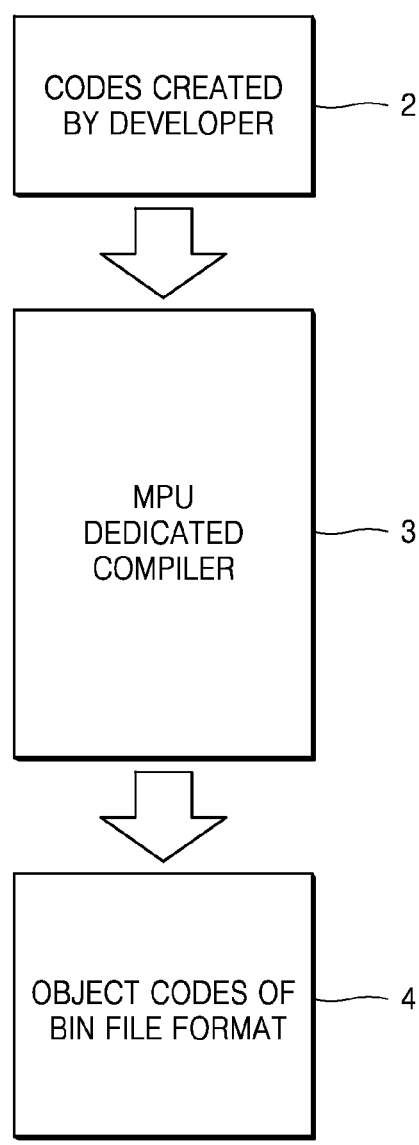
FIG. 2 is a block diagram illustrating developer's codes in a method of optimally compiling a PLC command according to some embodiments of the present disclosure.

FIG. 2 is a block diagram illustrating developer's codes in a method of optimally compiling a PLC command according to some embodiments of the present disclosure.

Referring to FIG. 2, a developer creates command processing function codes 2 by using a source editing tool. The command processing function codes 2 may be, for example, void move (void). The command processing function codes 2 created by the developer are compiled into object codes 4 of a binary format by a MPU dedicated complier 3. The MPU dedicated compiler 3 may be a C language or a C++ compiler.

The compiled object codes 4 of a binary format store thereon command processing functions. These object codes 4 are used to extract a start address and a size on a basis of command, so that a command map table is created.

Figure 3:
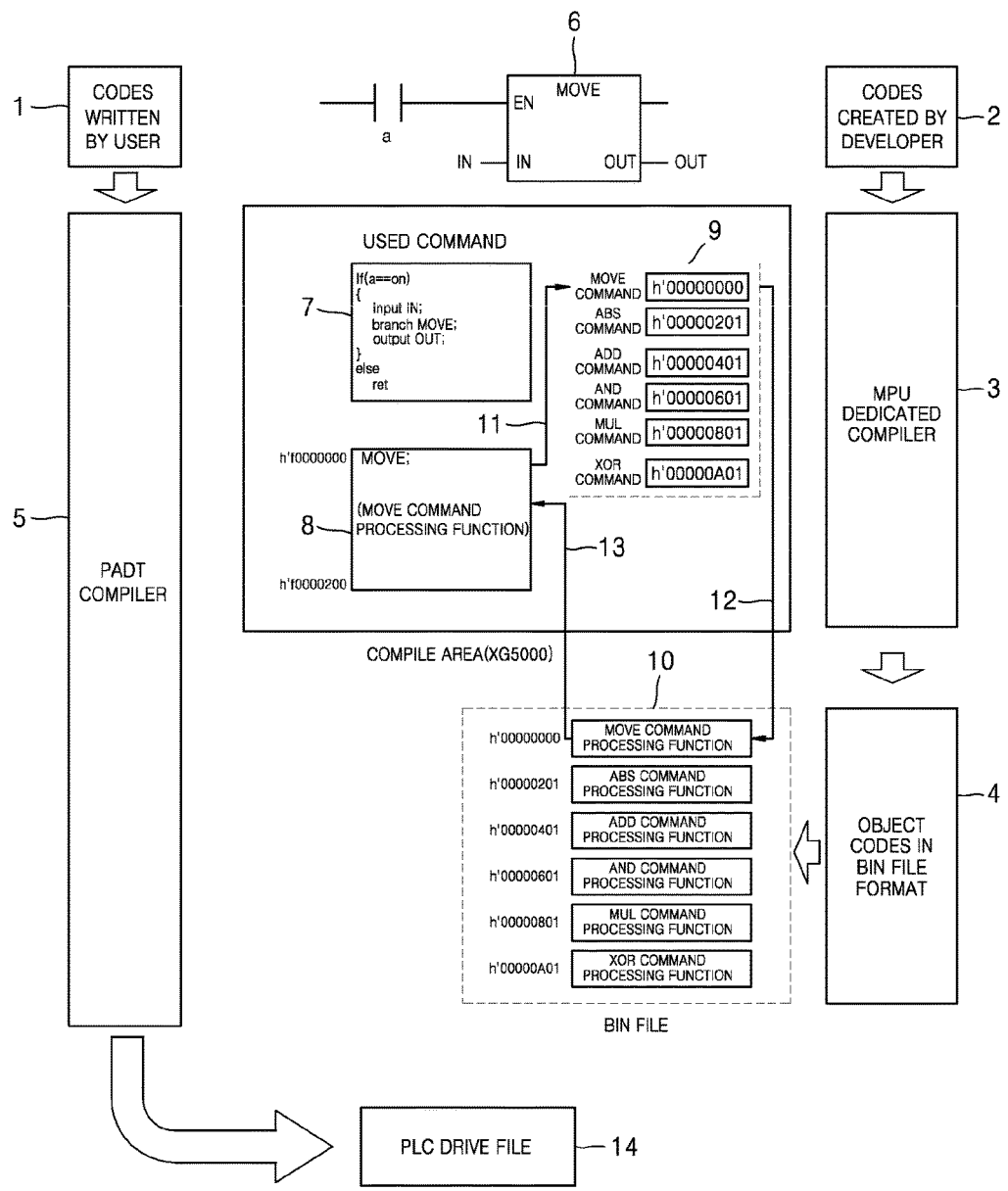
FIG. 3 is a block diagram illustrating a command processing in a method of optimally compiling a PLC command according to some embodiments of the present disclosure.

FIG. 3 is a block diagram illustrating a command processing in a method of optimally compiling a PLC command according to some embodiments of the present disclosure.

Referring to FIG. 3, a process executed when the user has written a MOVE command in the PADT is shown. A PADT compiler 5 may essentially convert the program written by the user into a format which enables a PLC to operate. In order to execute the command, processing functions should be invoked based on the command.

When the user has written a MOVE command 6 through the PADT, the MOVE command processing function may be invoked during processing the program 7 (8).

If the MOVE command is invoked, an address of a MOVE command processing function stored in the binary file 10 is identified with reference to the command map table 9 (11) and then the MOVE command processing function code stored in a binary file 10 is invoked (12). Subsequently, the MOVE command processing function code is inserted into a compile area (13). When the compile processing completes as described above, a PLC drive file 14 is generated.

Figure 4:
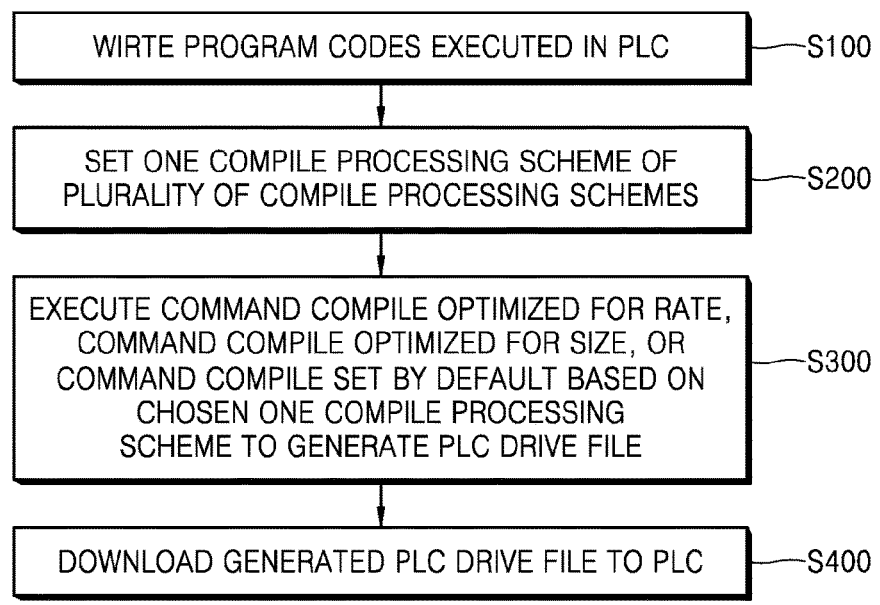
FIG. 4 is a flowchart illustrating a method of optimally compiling a PLC command according to some embodiments of the present disclosure.
Figure 5:
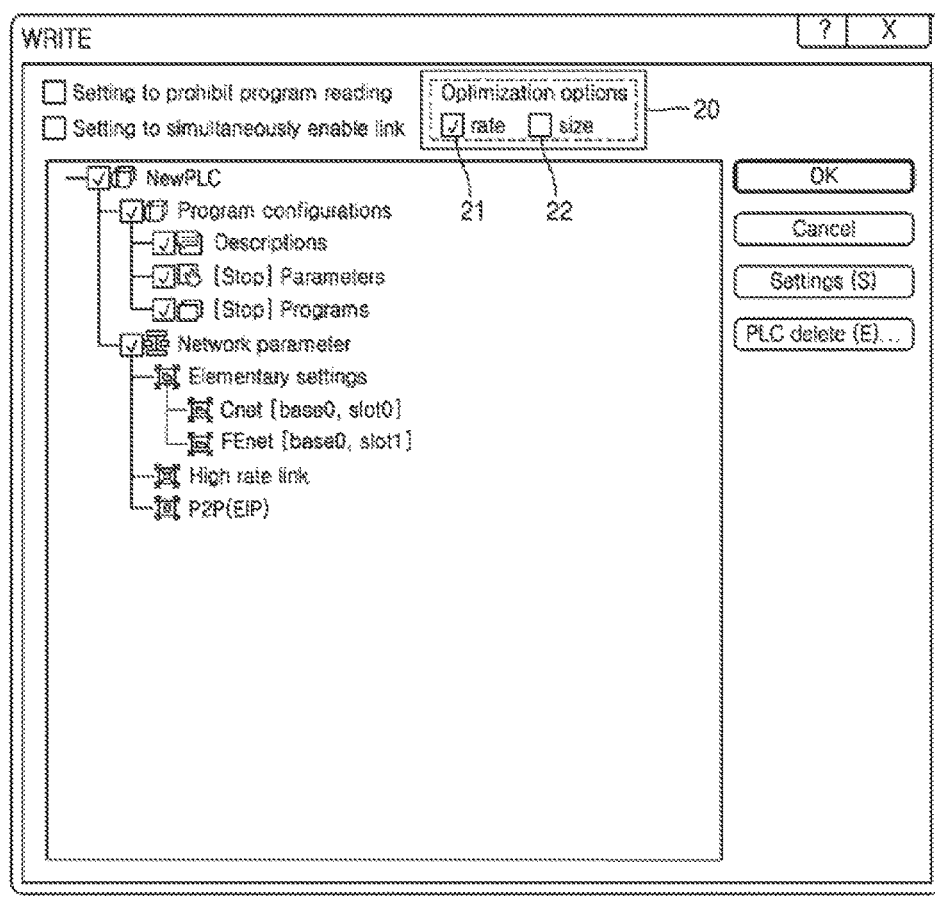
FIG. 5 is a view illustrating a process of setting the compile processing scheme to optimally compile a PLC command according to some embodiments of the present disclosure.

FIG. 4 is a flowchart illustrating a method of optimally compiling a PLC command according to some embodiments of the present disclosure. FIG. 5 is a view illustrating a process of setting the compile processing scheme to optimally compile a PLC command according to some embodiments of the present disclosure.

Referring to FIG. 4, program codes to be executed in the PLC are created by using a ladder program of the PADT (S100).

Thereafter, one of a plurality of compile processing schemes for a command comprised in a program to be executed in the PLC is set (S200).

For example, some embodiments of the present disclosure may cause the user to check or release a rate option and a size option so that a scheme for optimizing the compile processing can be set. At this time, if no option is chosen, it may be set that a compile or compiler utilizing elementary object codes is executed. Meanwhile, if the size option is chosen, it may be set that a compiler optimized for the size is executed.

Referring to FIG. 5, a choose box 20 of choosing the rate option or the size option is shown. The choose box 20 may include a first choose box 21 corresponding to the rate option and a second choose box 22 corresponding to the size option.

If the first box 21 has been checked, it is determined that the rate option is chosen. On the contrary, if the second choose box 22 has been checked, it is determined that the size option is chosen. However, if there are no any checks on the first choose box 21 and the second choose box 22, it is determined that a default option is chosen.

A command compile is executed according to the chosen one of the plurality of compile processing schemes for the command included in the program to be executed in the PLC and as a result the PLC drive file is generated (S300).

To do so, it is determined which compile processing scheme has been chosen from the plurality of compile processing schemes for the command included in the program to be executed in the PLC (S200).

Figure 6:
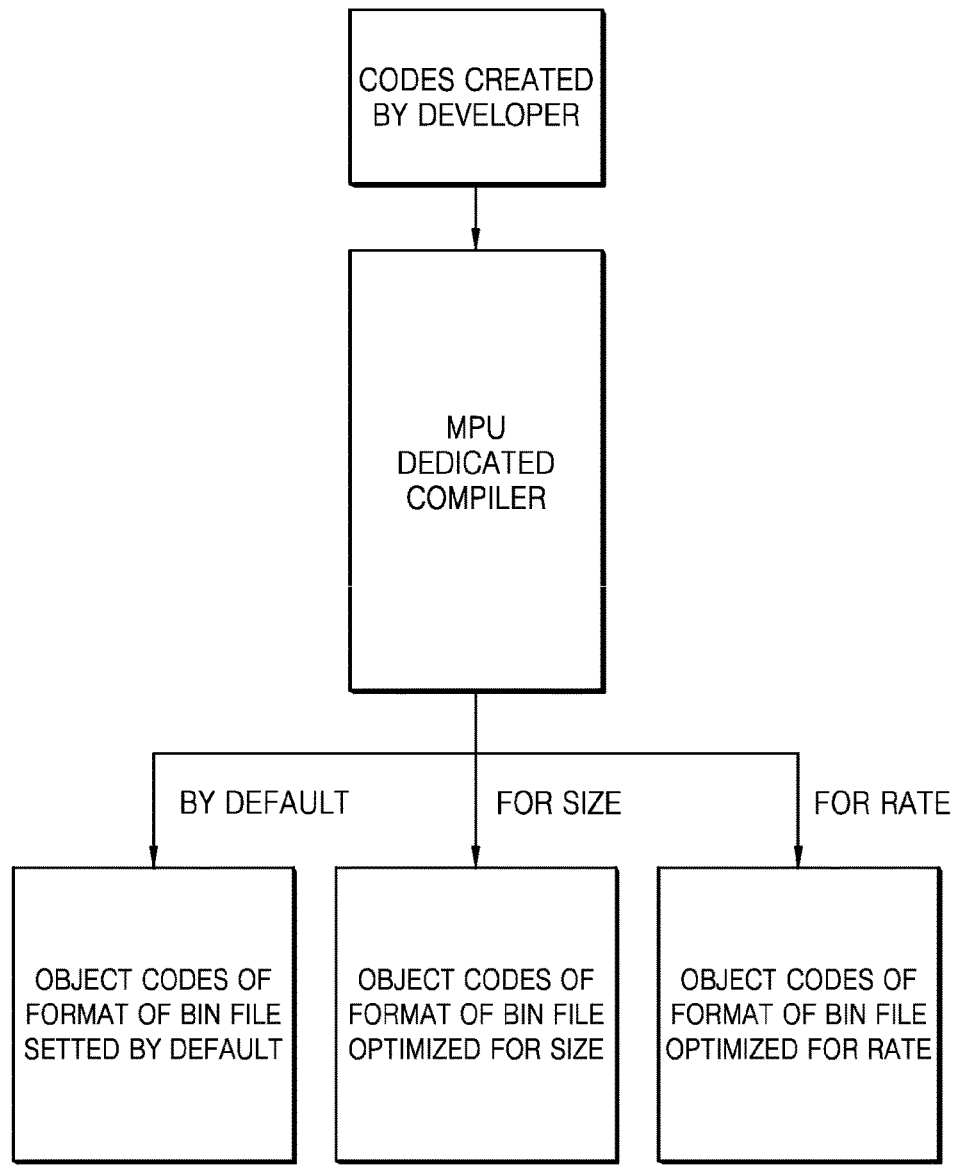
FIG. 6 is a block diagram illustrating a process of generating an object file in a method of optimally compiling a PLC command according to some embodiments of the present disclosure.

Referring to FIG. 6, when the chosen compile processing scheme is determined to be for a rate, the MPU dedicated compiler generates object codes in a format of binary file optimized for the rate.

When the chosen compile processing scheme is determined to be for the size, the MPU dedicated compiler generates object codes in a format of binary file optimized for the size.

When the chosen compile processing scheme is determined to be default, the MPU dedicated compiler generates object codes in a format of binary set by default.

Thereafter, upon processing the command, the PADT compiler may convert the program written by the user into a format which enables a PLC to operate.

That is, when the chosen compile processing scheme is for the rate, the PADT compiler uses the object codes optimized for the rate to execute the command compile or compiler optimized for the rate, thereby generating the PLC drive file. Meanwhile, when the chosen compile processing scheme is for the size, the PADT compiler uses the object codes optimized for the size to execute the command compile or compiler optimized for the size, thereby generating the PLC drive file.

Further, when the chosen compile processing scheme is default, the PADT compiler uses the object codes set by default to execute the command compile, thereby generating the PLC drive file.

The PLC drive file generated as described above is downloaded to the PLC (S400).

Figure 7:
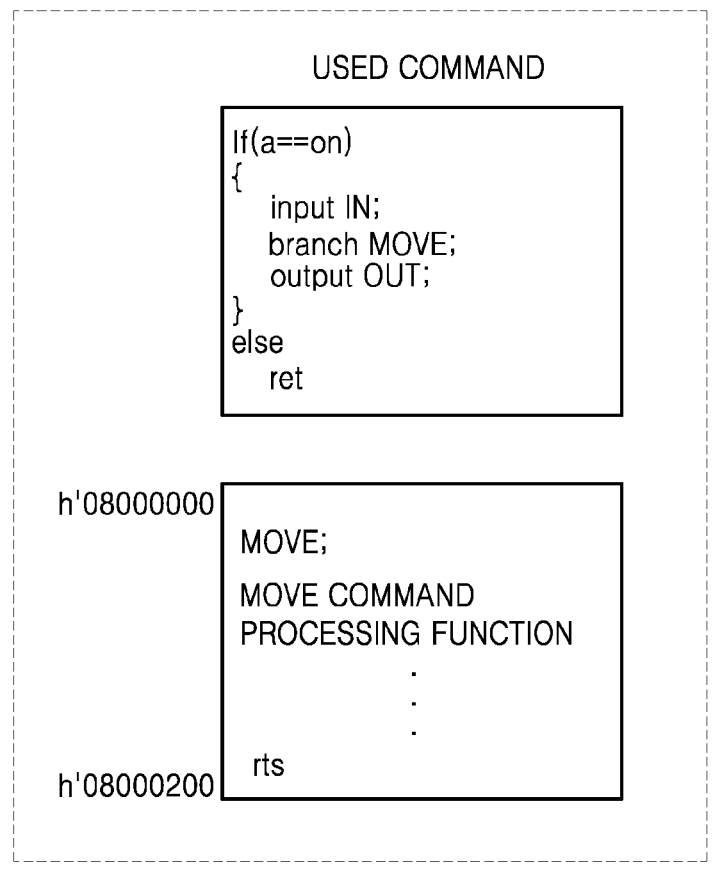
FIG. 7 is a view illustrating a method of optimally compiling a PLC command according to some embodiments of the present disclosure.

FIG. 7 is a view illustrating a method of optimally compiling a PLC command according to some embodiments of the present disclosure.

Referring to FIG. 7, it is determined which compile processing scheme has been chosen from the plurality of compile processing schemes for the command included in the program to be executed in the PLC (S301).

When the chosen compile processing scheme is determined to be for the rate in S301, it is determined whether the chosen compile processing scheme is a simple command processing based on any established criterion (S302). The criterion as to whether it is the simple command processing is whether the command can be directly compiled. If the command can be directly compiled, it conforms to the simple command.

As such, when the rate option is chosen, the PADT compiler examines the in-use command to determine whether the in-use command is one that can be compiled by a direct compile processing scheme.

For example, if codes of one command are very long and complicate, the direct compile cannot be executed because it may be written into C codes in a CPU. Therefore, when it is determined that the command can be directly compiled, the PADT compiler directly executes the compile in an assembly language optimized for the rate. However, when it is determined that the command cannot be directly compiled, the PADT compiler follows a command execution routine, which is written into C codes, in relation to the rate option.

Figure 8:
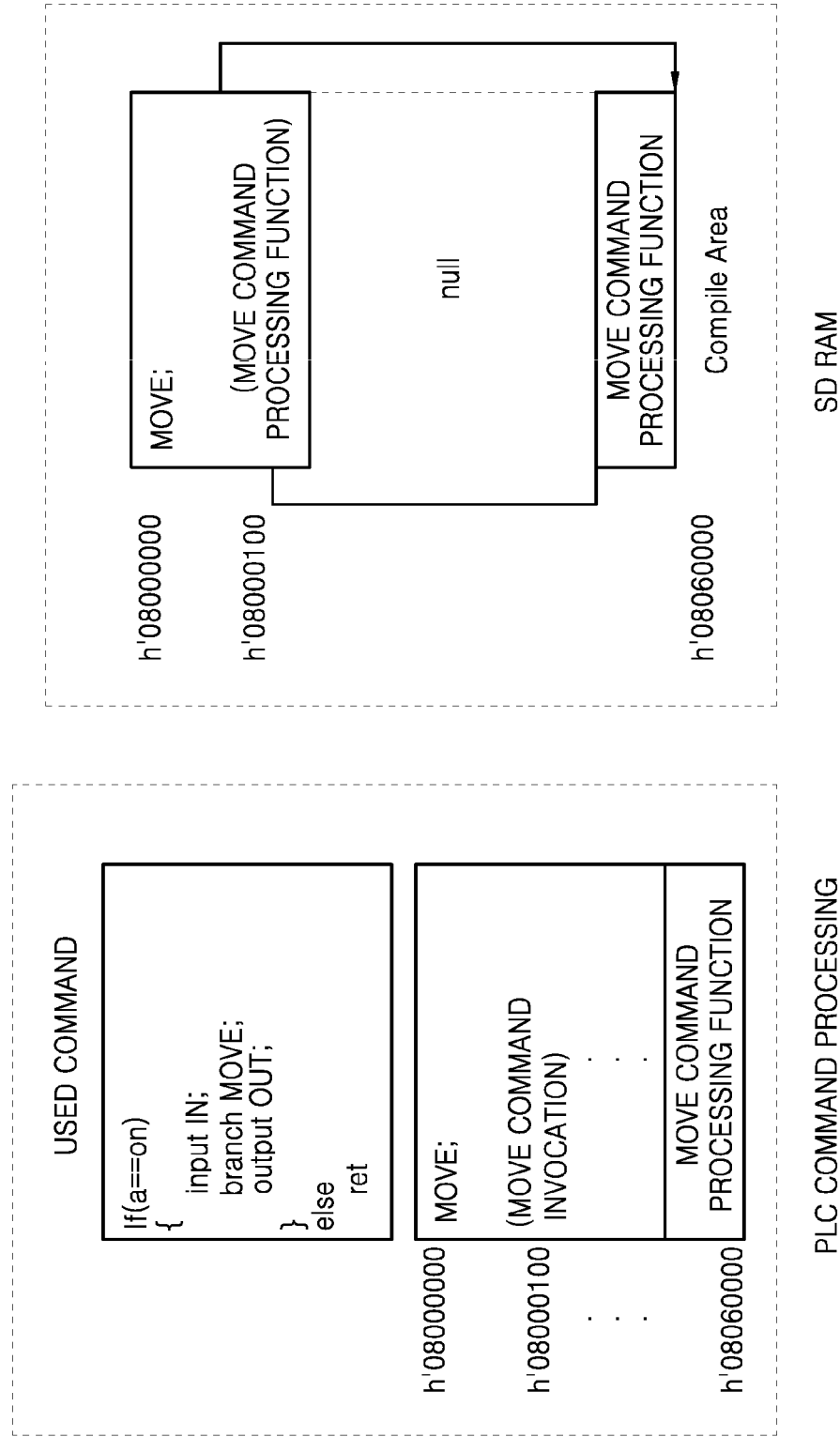
FIG. 8 is a view illustrating a direct compiling in a method of optimally compiling a PLC command according to some embodiments of the present disclosure.

Herein, the direct compile is any compile processing scheme by which the PADT compiler executes and stores the command as shown in FIG. 8. When the user writes any command, the PADT compiler upon compiling allows all codes for processing the command to be stored on a PLC compile area. Then, if there is any command used in the program processing, the command can be executed without the need of invoking any separate function because execution codes for the command have been stored on the compile area.

Figure 9:
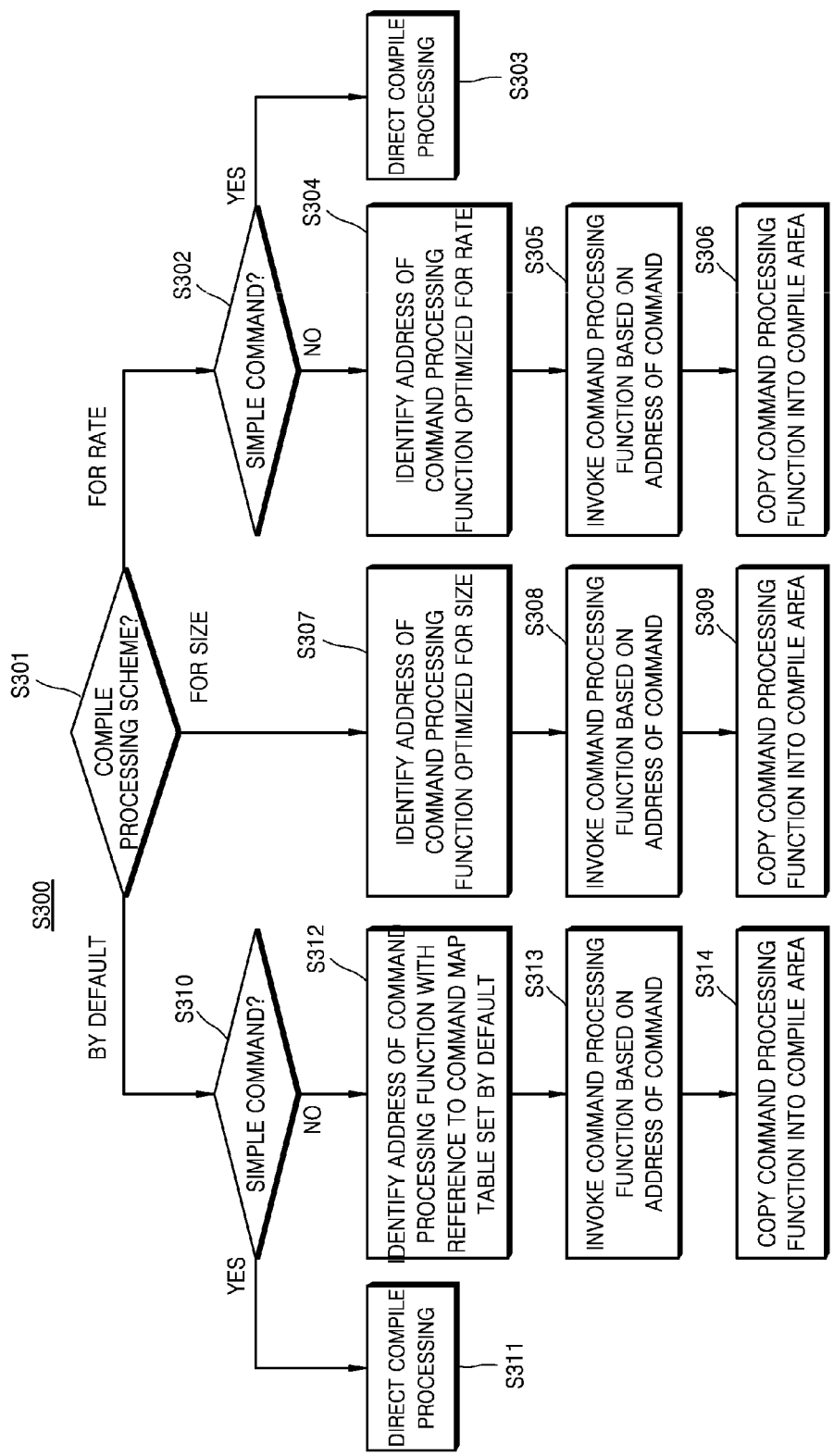
FIG. 9 is a flowchart illustrating an indirect compiling in a method of optimally compiling a PLC command according to some embodiments of the present disclosure.

Meanwhile, for the indirect compile, when the user writes any command by the ladder program as shown in FIG. 9, the PADT compiler examines the command while processing the compile. The PADT compiler identifies an address of the command processing function stored in the binary file with reference to the command map table stored on the PADT and then invokes the command processing function. Then, the command processing function needed to execute the command is copied to an ending portion into the compile area of the PLC. Accordingly, upon driving the PLC, the command processing can be made by identifying the address of the command processing function and invoking the stored function.

When in S302 the chosen compile processing scheme is determined to be a simple command processing, the command compile is executed in an assembly language by the direct compile processing scheme (S303).

Meanwhile, when in S302 the chosen compile processing scheme is determined to not be a simple command processing, the PADT compiler identifies an address of the command processing function stored in the binary file with reference to the command map table optimized for the rate (S304). Subsequently, the command processing function is invoked based on the address of the command processing function (S305), the command processing function needed to execute the command is copied into the compile area so that the command compile is executed by the indirect compile processing scheme (S306). Accordingly, upon driving the PLC, the command can be executed by identifying the address of the command processing function and invoking the stored function.

Meanwhile, when in S301 the chosen compile processing scheme is determined to be for the size, the PADT compiler identifies an address of the command processing function stored in the binary file with reference to the command map table optimized for the size (S307). Subsequently, the command processing function is invoked based on the address of the command processing function (S308), the function needed to execute the command is copied into the compile area so that the command compile is executed by the indirect compile processing scheme (S309). Accordingly, upon driving the PLC, the command can be executed by identifying the address of the command processing function the PLC and invoking the stored function.

As such, if the chosen compile processing scheme is for the size, the PADT compiler executes the indirect compile on the in-use command. The indirect compile processing scheme is useful to reduce the overall program size because it would copy the execution routine only once in relation to the identical command. Further, it may compile the command execution routine created in C codes in relation to the size option upon processing the indirect compile, thereby reducing the program size.

Meanwhile, when the chosen compile processing scheme is determined to be default in S301, it is determined whether the chosen compile processing scheme is a simple command processing based on any established criterion (S310).

When in S310 the chosen compile processing scheme is determined to be a simple command processing, the command compile is executed by the direct compile processing scheme (S311).

However, when in S310 the chosen compile processing scheme is determined to not be a simple command processing, an address of the command processing function stored in the binary file with reference to the command map table set by default is identified (S312). Subsequently, the command processing function is invoked based on the address of the command processing function (S313), the function needed to execute the command is copied into the compile area so that the command compile is executed by the indirect compile processing scheme (S314). Accordingly, upon driving the PLC, the command can be executed by identifying the address of the command processing function and invoking the stored function.

As such, the user may choose the compile processing scheme for the command suitably to system environment. If the rate option is chosen, the PLC program is compiled to optimize the processing rate and thus the control is enabled in an increased rate of 32% relative to the prior art. Also, if the size option is chosen, the program may be used with its size increasing up to 30% relative to the existing program size. Therefore, the PLC employing some embodiments of the present disclosure becomes flexible in its processing rate and program size where it can cover, so that it can be applied to various systems.

According to some embodiments of the present disclosure, a method of optimally compiling a PLC program causes a user to choose any compile processing scheme so that the PLC program can be flexibly applied to various systems.

Figure 10:
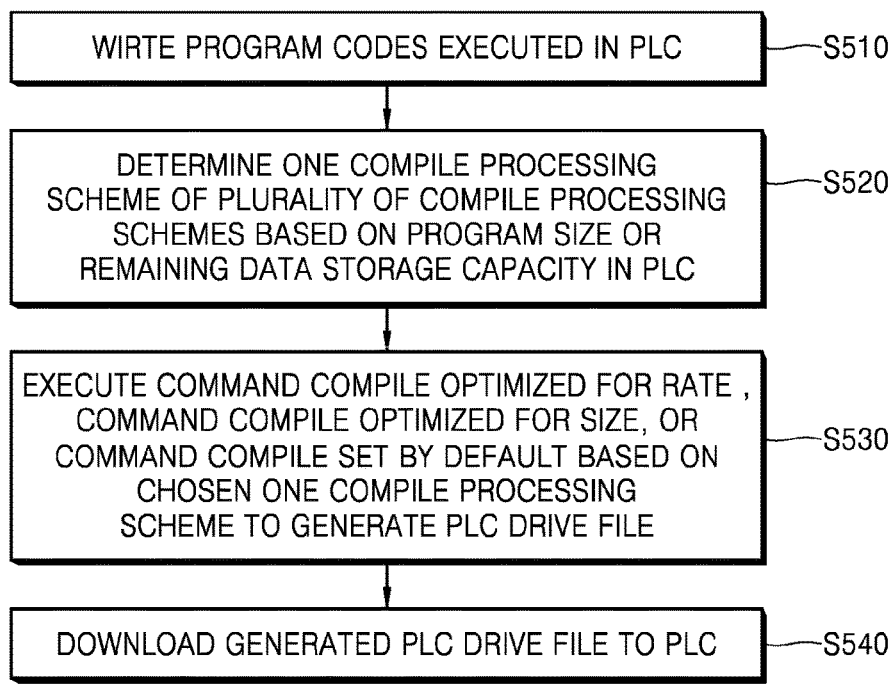
FIG. 10 is a flowchart illustrating a method of optimally compiling a PLC command according to some embodiments of the present disclosure.

FIG. 10 is a flowchart illustrating a method of optimally compiling a PLC command according to some embodiments of the present disclosure.

Referring to FIG. 10, program codes to be executed in the PLC are written by using a ladder program of the PADT (S510).

The program is set to automatically choose one of a plurality of compile processing schemes for a command included in a program to be executed in the PLC, based on a program size or a remaining data storage capacity in the PLC (S520).

For example, in order to automatically choose the one compile processing scheme, the program may be set so that the compile processing scheme for the rate is chosen under a normal condition while the compile processing scheme for the size is chosen when the program size is over any reference size.

For another example, in order to automatically choose the one compile processing scheme, the program may be set so that the compile processing scheme for the rate is chosen under a normal condition while the compile processing scheme for the size is chosen when the remaining data storage capacity in the PLC is below any reference capacity.

A command compile is executed according to one automatically chosen from the plurality of compile processing schemes for the command included in the program to be executed in the PLC and as a result the PLC drive file is generated (S530).

To do so, it is determined which compile processing scheme has been chosen from the plurality of compile processing schemes for the command included in the program to be executed in the PLC.

When the chosen compile processing scheme is determined to be for the rate, the command compile or compiler optimized for the rate is executed. When the chosen compile processing scheme is determined to be for the size, the command compile or compiler optimized for the size is executed.

When the chosen compile processing scheme is determined to be default, the command compile set by default is executed to generate object codes, and as a result the PLC drive file is generated The generated PLC drive file is downloaded to the PLC (S540).

While embodiments according to the present disclosure have been described above, they are non-exhaustive, and those skilled in the art will understand that various modifications and changes derived therefrom can be done within an equivalent range falling into the scope of the present disclosure. Therefore, the true technical scope of the present disclosure should be defined by the appended claims. Various components illustrated in the figures may be implemented as hardware and/or software and/or firmware on a processor, ASIC/FPGA, dedicated hardware, and/or logic circuitry. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A method of compiling a PLC (Programmable Logic Controller) command, the method comprising:
   determining a chosen compiler processing scheme chosen from a plurality of compiler processing schemes for a command included in a program to be executed in a PLC;
   executing a command compiler optimized for a rate or a size based on the chosen compiler processing scheme;
   wherein determining a chosen compiler processing scheme includes providing a first setting to automatically choose one compiler processing scheme of the plurality of compiler processing schemes for the command as the chosen compiler processing scheme based on a program size or a remaining data storage capacity in the PLC; and
   wherein providing the first setting to automatically choose one compiler processing scheme includes:
      providing a second setting to choose a compiler processing scheme for the rate under a normal condition or to choose a compiler processing scheme for the size when the program size is over a reference size, and
      providing a third setting to choose the compiler processing scheme for the rate under a normal condition or to choose the compiler processing scheme for the size when the remaining data storage capacity in the PLC is below a reference capacity, and wherein executing the command compiler includes:
      determining whether the chosen compiler processing scheme is a simple command processing scheme based on the command when the chosen compiler processing scheme is determined to be the compiler processing scheme for the size;
      responsive to determining that the chosen compiler processing is a simple command processing scheme, executing the command compiler in an assembly language by a direct compiler processing scheme; and
      responsive to determining that the chosen compiler processing scheme is not a simple command processing scheme, executing the command compiler in an indirect compiler processing scheme.

2. The method according to claim 1, wherein executing the command compiler in the indirect compiler processing scheme includes:
   identifying an address of a command processing function stored in a binary file with reference to a command map table optimized for the size;
   invoking the command processing function;
   copying the command processing function needed to execute the command into a compile area to identify the address of the command processing function upon driving the PLC; and
   invoking the stored function to execute the command.

3. The method according to claim 1, wherein executing the command compiler includes:
   when the determined compiler processing scheme is determined to be for the size:
      executing the command compiler in an indirect compiler processing scheme by identifying an address of a command processing function stored in a binary file with reference to a command map table optimized for the size;
      invoking the command processing function;
      copying the command processing function needed to execute the command into a compile area to identify the address of the command processing function upon driving the PLC; and
      invoking the stored function to execute the command.

4. The method according to claim 1, wherein executing the command compiler includes:
   when the chosen compiler processing scheme is determined to be a default scheme, determining whether the determined compiler processing scheme is a simple command processing based on the command;
   when the determined compiler processing scheme is determined to be a simple compiler processing scheme, executing the command compiler by a direct compiler processing scheme; and
   when the determined compiler processing scheme is determined to be not a simple compiler processing scheme,
      executing the command compiler in an indirect compiler processing scheme by identifying an address of a command processing function stored in a binary file with reference to a command map table set by default;
      invoking the command processing function;
      copying the command processing function needed to execute the command into a compile area to identify the address of the command processing function upon driving the PLC; and
      invoking the stored function to execute the command.

5. The method according to claim 1, wherein determining one compiler processing scheme includes:
   providing a first option box corresponding to a rate option and a second option box corresponding to a size option; and
   determining that the rate option is chosen if the first option box has been checked, the size option is chosen if the second option box has been checked, and a default compiler processing scheme is chosen if no option box has been checked.

* * * * *